July 17, 1934.     J. L. BARNARD     1,967,048
ELECTRIC MOTOR
Filed March 17, 1933      2 Sheets-Sheet 1
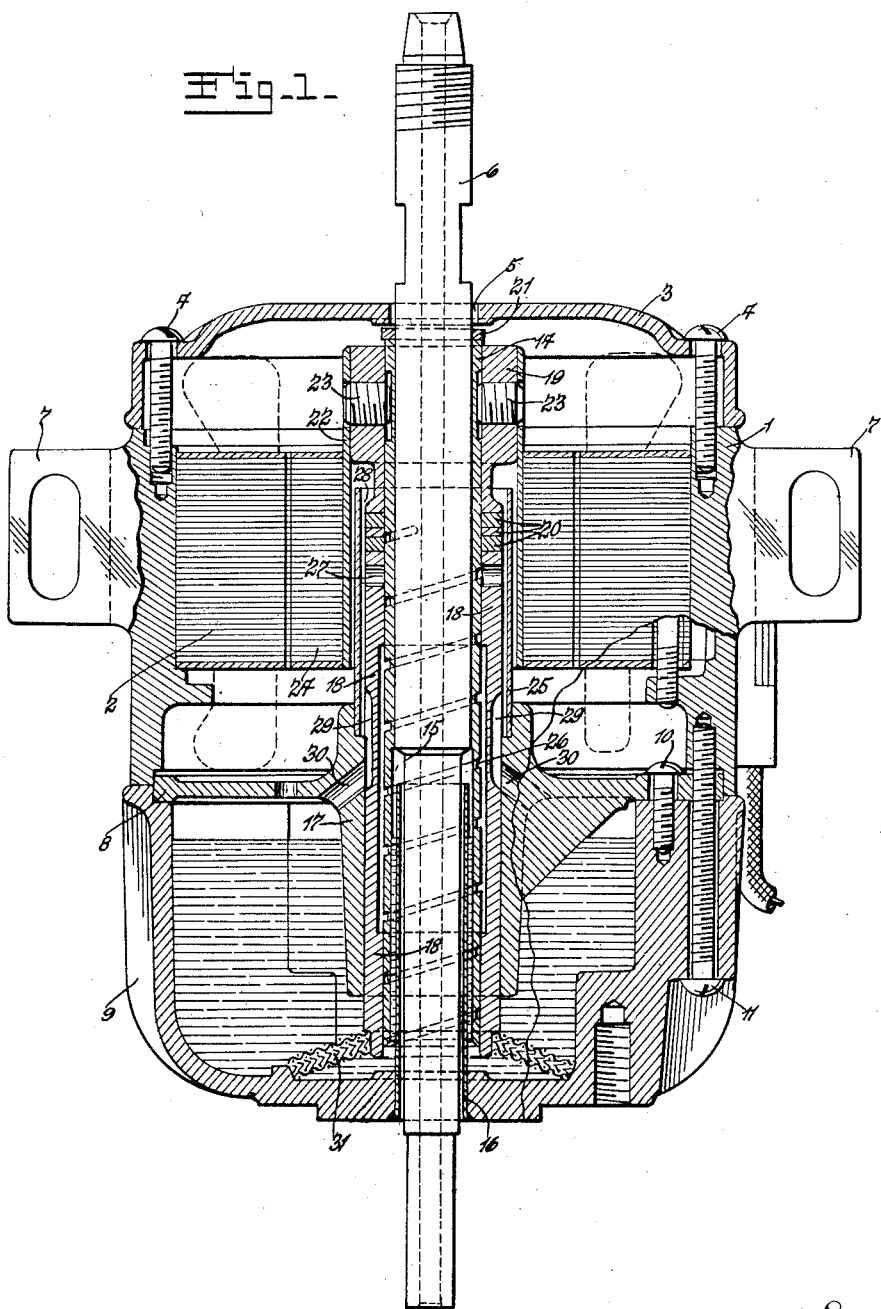
Inventor
John L. Barnard
by Rippey Kingsland
His Attorneys.

July 17, 1934. J. L. BARNARD 1,967,048
ELECTRIC MOTOR
Filed March 17, 1933 2 Sheets-Sheet 2
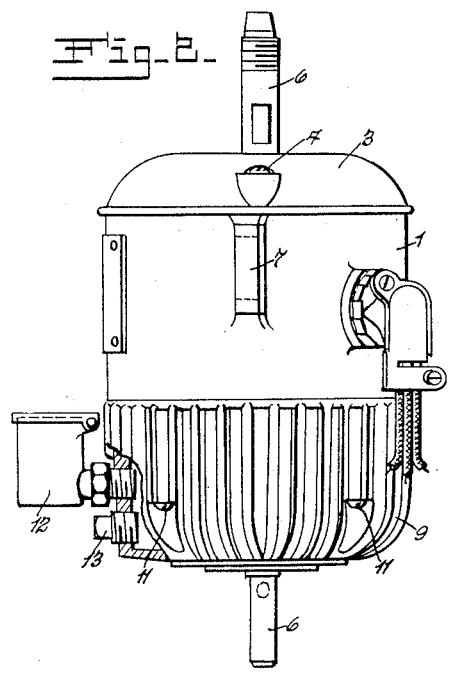
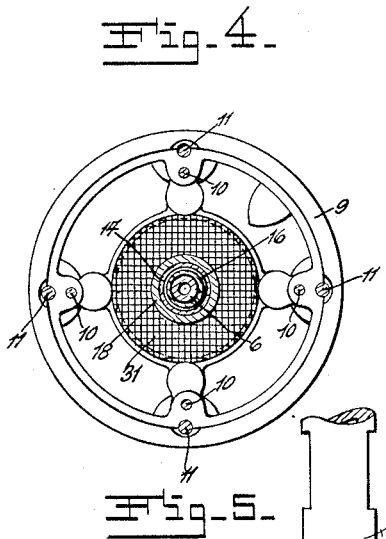
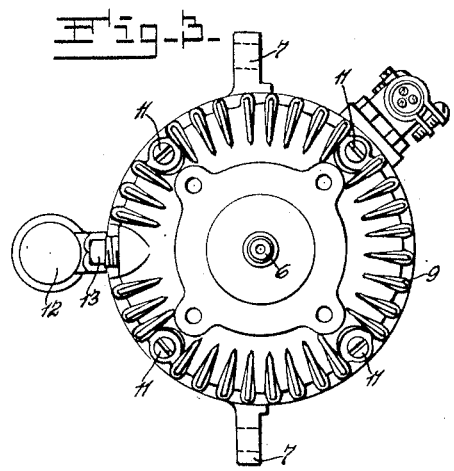
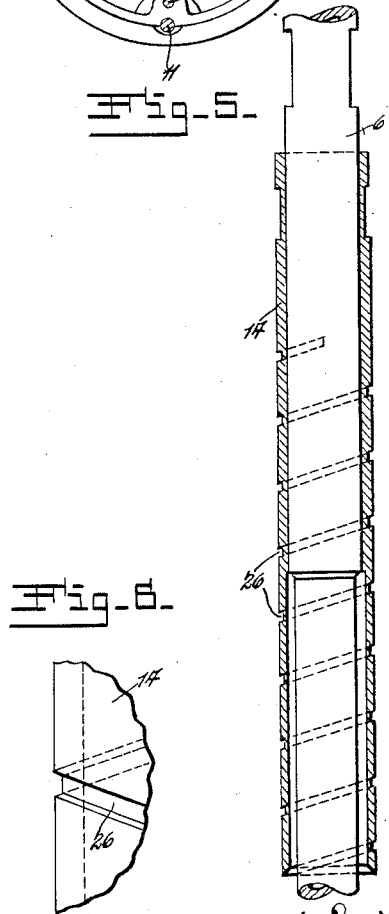

Patented July 17, 1934

1,967,048

UNITED STATES PATENT OFFICE 1,967,048

ELECTRIC MOTOR

John L. Barnard, Richmond Heights, Mo., assignor to The Emerson Electric Mfg. Co., St. Louis, Mo., a corporation of Missouri Application March 17, 1933, Serial No. 661,289

7 Claims. (Cl. 172—36)

This invention relates to electric motors and more particularly to a lubricating system for a motor having a vertical shaft.

An object of this invention is to provide an efficient lubricating system for a vertical motor.

The invention is particularly applicable to motors for operating a spinner type oil burner. In the conventional type of motor having two bearings one at each end the top bearing being close to the burner flame overheats and cannot be kept properly lubricated. It may be said therefore that an object of this invention is to provide, in a motor of the character described, satisfactory bearings and lubricating means notwithstanding adverse heat conditions at the upper end of the motor; it being understood, however, that the utility of the invention is not limited to such an environment.

Other and specific objects will be apparent from the following detail description taken in connection with the accompanying drawings, in which—

Fig. 1 is a vertical section of the motor.

Fig. 2 is an elevation.

Fig. 3 is a reverse plan view.

Fig. 4 is a cross section.

Fig. 5 is a detail of the shaft.

Fig. 6 is a detail of the shaft sleeve showing an oil conveyor groove.

The frame of the motor includes the usual ring 1 to which is secured the stator parts 2. A top cover plate 3 is secured to the ring 1 by screws 4 and has a central hole 5, through which a vertical shaft 6 extends. Lugs 7, for support of the motor, may be cast integral with the ring 1. The casing of the motor, which includes the ring 1 and top plate 3, is completed by a horizontal plate or bracket 8 which is secured at the lower end of the ring 1. A bottom lubricating cup or bell 9 has its top edge in registry with the bottom edge of the ring 1, and the adjacent edges of the bell and ring are recessed to receive the outer edge of the bracket 8. The bracket 8 is secured to the bell 9 by screws 10, and screws 11 pass through the bell 9, the bracket 8 and engage in the ring 1, as shown in Fig. 1. The joints between the bracket 8 and the bell 9 are sealed oil tight. The bell 9 is provided with a filler cup 12 and a drain plug 13, as shown in Fig. 2.

The shaft 6 has a sleeve 14 which is pressed on and, therefore, may be considered as a part of the shaft itself. The outer circumference of the shaft 6 is relieved at its lower end, as shown in Figs. 1 and 5, and the bore of the sleeve 14 is also relieved at its lower end, thus providing a considerable clearance 15 between the shaft and the sleeve at the lower end of the motor. This clearance 15 is provided in order to accommodate a sleeve 16, which is pressed in a bore, in the bottom of the bell or cup 9, and extends upwardly to a point above the level of the lubricant in the cup. A substantial clearance is provided between the sleeve 16 and the shaft 6 since it is not intended that the shaft bear against the inner surface of the sleeve 16.

The bracket 8 has a boss 17, in which a tubular bearing 18 is secured by a pressed fit. The bore of the bearing 18 is relieved in the center, leaving the proper amount of bearing surface for the sleeve 14 at each end of the bearing.

A collar 19 is secured to the upper end of the sleeve 14 and the shaft 6, and thrust washers 20 are positioned between the lower face of the collar and the upper end of the bearing 18. A thrust washer 21 is positioned about the shaft 6 at the upper end of the sleeve 14 and is adapted to engage the inner face of the top plate 3, thus preventing upward displacement of the shaft. A supporting sleeve 22 is secured at its upper end about the collar 19, set screws 23 passing through the sleeve 22 and the collar 19 and engaging the sleeve 14. The sleeve 22 extends downwardly past the upper end of the bearing 18 and provides a considerable clearance with the outer face of the bearing. An armature 24 is secured to and supported by the sleeve 22.

A baffle sleeve 25 is secured at its bottom end to the boss 17 and extends upwardly in the clearance between the sleeve 22 and the bearing 18 to a point above the thrust washers 20.

The outer face of the sleeve 14 has a helical groove 26 extending from its bottom to a point adjacent the thrust washers 20, and provides means for conveying lubricant from the lubricant well 9 to the top of the bearing 18, as well as to the thrust washers 20. Radial holes 27 are provided at the upper end of the bearing 18 and serve as outlets for the lubricant, as well as a partial relief of pressure set up by groove 26. A clearance 28 between the bearing and the inner face of the baffle sleeve 25 provides a conduit for the return of the lubricant toward the well. This conduit is completed by grooves 29, in the outer face of the bearing 18, and holes 30, passing through the boss 17.

While the helical groove 26 is shown as running through the entire bearing length, and while such is the preferred construction, oil can be forced satisfactorily to the top of the bearing, if this groove extends only part way up into the bearing.

A filter disc 31 has its outer edge engaging the bottom of the chamber formed by the cup 9 and its inner edge engaging the outer surface of the bearing 18.

It will be seen that the shaft, which includes the sleeve 14, is wholly journalled in the bearing 18, supported by the bracket 8, and this bearing, as well as the thrust bearing, comprising the washers 20, is provided with means for supplying lubricant from the cup below. It will be obvious that the course of the lubricant in its cycle is through the filter 31, then between the sleeve 14 and the bearing 18, as conveyed by the helix 26, to the holes 27 in the top of the bearing 18 as well as to the thrust washers 20, thence through the conduit including the clearance 28, the grooves 29 and the holes 30, returning to the lubricant cup.

The shaft member 6 together with the sleeve member 14, which is permanently secured to the shaft member 6, may be considered as one shaft, the sleeve forming the outer surface of the shaft and being journalled in the shaft bearing. It is apparent that the sleeve 14 is manufactured as a separate part and the shaft later assembled merely for the purpose of convenience in manufacture, in order to provide the space at the lower end of the shaft to accommodate the sleeve 16. Theoretically the cylindrical recess in the lower part of the shaft to accommodate the sleeve 16 could be cut from a solid shaft but it can best be provided by manufacturing the two parts separately and later assembling them as a unity.

Parts of the invention may be used without the whole, various changes may be made in the details of construction within the scope of the appended claims, and various additions and improvements may be made thereto without departing from the spirit of this invention.

I claim:

1. In an electric motor, a bearing bracket supported by the motor frame below the armature, a tubular bearing supported by the bracket, a lubricant well secured below the bracket and adapted to contain lubricant at a level above the bottom of the bearing and below the bracket, a vertical shaft journalled wholly in said tubular bearing, a thrust bearing seated at the top of the tubular bearing and supporting the shaft, means for conveying lubricant between the shaft and the tubular bearing from the well to the thrust bearing, and a conduit for returning the lubricant to the well.

2. In an electric motor, a frame member, stator laminations secured to and supported by the frame member, a cup adapted to contain lubricant and having its upper edge registering with the bottom edge of said frame member, a horizontal plate secured to the frame member at the bottom thereof, a tubular bearing wholly supported by said plate and projecting into the cup, a vertical shaft journalled in the bearing, and means for conveying lubricant between the shaft and the bearing from the well to the top of the bearing.

3. In an electric motor, a frame member, stator laminations secured to and supported by the frame member, a cup adapted to contain lubricant and having its upper edge registering with the bottom edge of said frame member, a horizontal plate secured to the frame below the stator laminations, a tubular bearing wholly supported by said plate and projecting into the cup, a vertical shaft extending through the cup, a bearing sleeve secured to and about the shaft, journalled in the bearing, spaced from the shaft at its lower end and extending into the cup, and a sleeve about the shaft, secured to the bottom of the cup, extending upwardly from the bottom of the cup to a point above the level of lubricant for which the cup is adapted and positioned between the shaft and the bearing sleeve.

4. In an electric motor, a frame, a vertical shaft, a spacing sleeve secured to and supported by the shaft, an armature secured to said spacing sleeve, a bracket supported on the frame below the armature, a tubular bearing supported by the bracket and extending upwardly between the spacing sleeve and the shaft, a baffle sleeve secured to the bracket and extending upwardly between the bearing and the spacing sleeve to a point above the top of the bearing, and an oil well supported by the frame below the bracket and adapted to contain lubricant at a level above the bottom of the bearing.

5. In an electric motor, a frame, a vertical shaft, a spacing sleeve secured at its top to the shaft, an armature supported by the spacing sleeve, a bracket supported by the frame below the armature, a tubular bearing for the shaft, supported by the bracket and extending upwardly between the spacing sleeve and the shaft, a thrust bearing at the top of the tubular bearing and supporting the shaft, a baffle sleeve secured to and supported by the bracket and extending upwardly between the said bearings and the spacing sleeve to a point above the thrust bearing, and an oil well supported by the frame below the bracket and adapted to contain lubricant at a level above the bottom of the tubular bearing.

6. In an electric motor, a frame, a vertical shaft, a spacing sleeve secured at its top to the shaft, an armature supported by the spacing sleeve, a bracket supported by the frame of the motor below the armature, a tubular bearing for the shaft, supported by the bracket and extending upwardly between the spacing sleeve and the shaft, a thrust bearing at the top of the tubular bearing and supporting the shaft, a baffle sleeve secured to and supported by the bracket and extending upwardly between the said bearings and the spacing sleeve to a point above the thrust bearing, means for conveying lubricant from the bottom of the tubular bearing between the shaft and the tubular bearing to the thrust bearing, and a conduit from the space between the baffle sleeve and the tubular bearing to the well for the return of lubricant thereto.

7. In an electric motor, a frame, a vertical shaft, a collar secured to the shaft, a downwardly extending spacing sleeve secured at its top to the collar, spaced from the shaft and supporting an armature, a bracket supported by the frame below the armature, a tubular bearing for the shaft, supported by the bracket, extending upwardly between the shaft and the spacing sleeve and downwardly from the bracket, a thrust bearing between the tubular bearing and the collar, a baffle sleeve supported by the bracket and extending upwardly above the thrust bearing and between the said bearings and the spacing sleeve, a lubricant cup supported by the frame below the bracket and adapted to contain a lubricant at a level above the bottom of the tubular bearing, conveying means, including a helical groove in the shaft extending from the bottom of the tubular bearing toward the thrust bearing, and a conduit for returning lubricant from the baffle sleeve to the lubricant cup.

JOHN L. BARNARD.